United States Patent [19]
Wissgott

[11] Patent Number: 6,071,617
[45] Date of Patent: Jun. 6, 2000

[54] PACKAGING HAVING A FOOD-GRADE BARRIER COATING AND PREPARATION THEREOF

[75] Inventor: Ulrich Wissgott, Singapore, Singapore

[73] Assignee: Nestec S.A., Vevey, Switzerland

[21] Appl. No.: 08/887,979

[22] Filed: Jul. 3, 1997

[51] Int. Cl.[7] .............................. B32B 9/04; B32B 29/00; A23B 1/00; B05D 1/36

[52] U.S. Cl. ..................... 428/411.1; 428/537.5; 426/106; 426/415; 427/384; 427/414

[58] Field of Search ................................ 428/411.1, 34.2, 428/35.7, 537.5; 106/124.1, 148.1, 148.5, 158.1; 427/384, 414; 426/106, 132, 415

[56] References Cited

U.S. PATENT DOCUMENTS

| | | | |
|---|---|---|---|
| 3,323,922 | 6/1967 | Durst | 99/166 |
| 4,555,417 | 11/1985 | Gibson et al. | 427/361 |
| 4,874,618 | 10/1989 | Seaborne et al. | 426/76 |
| 5,182,130 | 1/1993 | Haralampu et al. | 427/3 |
| 5,192,566 | 3/1993 | Cox et al. | 428/89 |
| 5,401,518 | 3/1995 | Adams et al. | 426/89 |
| 5,403,600 | 4/1995 | Reutimann et al. | 426/89 |
| 5,456,941 | 10/1995 | Takahashi et al. | 427/2.14 |
| 5,480,973 | 1/1996 | Goodlad et al. | 530/386 |
| 5,573,797 | 11/1996 | Wilhoit | 426/106 |
| 5,591,491 | 1/1997 | Ando et al. | 427/544 |

FOREIGN PATENT DOCUMENTS

| | | |
|---|---|---|
| 54-95749 | 7/1979 | Japan . |
| 3198754 | 8/1991 | Japan . |

OTHER PUBLICATIONS

Derwent Information Ltd. Database Abstract. WPI Accession No. 70–65618B/36, Abstract of Japanese Kokai JP–A–54–95749 (1979).

Derwent Information Ltd., Database Abstract WPI Accession No. 91–299416/199141, abstract of Japanese Kokai JP–A–3–198754; and.

*Primary Examiner*—Paul Thibodeau
*Assistant Examiner*—Holly C. Rickman
*Attorney, Agent, or Firm*—Vogt & O'Donnell, LLP

[57] ABSTRACT

A coated packaging material for packaging foodstuffs is prepared with a component mixture of egg white powder, a plasticizer, an emulsifier and water which, by coating mixture weight, are in amounts, respectively, of from about 25% to 30%, 10% to 15%, 2% to 5% and 50% to 63%, the mixture being applied on a packaging material to coat the material and then being heated to coagulate and dry the coating. Upon drying, the coating is made up of from about 60% to 70% heat-coagulated egg white, 25% to 30% plasticizer, 5% to 10% emulsifier and 3% to 8% water. The coated packaging material is employed for packaging a foodstuff so that the coating is positioned between the foodstuff and packaging material.

22 Claims, No Drawings

PACKAGING HAVING A FOOD-GRADE BARRIER COATING AND PREPARATION THEREOF

BACKGROUND OF THE INVENTION

The present invention relates to packaging materials and particularly to packaging materials for packaging foodstuffs and more particularly to packaging with packaging materials having a food grade coating, particularly a food grade barrier coating.

The coating of substrates with food grade films is already known. Japanese Kokai JP-A-54-95749 describes a packing coating based on soybean protein and other proteins. There are several problems with this type of coating. First, the need to use several types of protein makes it more difficult and more expensive to manufacture this kind of coating. Further, the use of soybean protein, in particular, has several drawbacks, in that, firstly a coating solution based on soybean protein takes some time to dry to form a coating; secondly, the mechanical and thermal properties of soy protein-based coatings are rather poor and the coating is not transparent; and thirdly, this type of coating must be bound to a specific type of in that, to obtain proper adhesion, the substrate must be a synthetic resin which is active to soybean protein.

Japanese Kokai JP-A-3-198754 describes a type of substrate coating for food and drug packing which is waterproof. However it is only water-proof at room temperature or slightly above. According to this patent, the film is thermally soluble and dissolves in 3 to 5 min. at 60 to 70° C. if it is in contact with water. Furthermore, the film appears to have rather poor mechanical properties since a three-layer structure is required to ensure acceptable physical strength. Also the film contains, among other components, pullulan which is not approved for food use either in Europe or in the United States of America.

Therefore, there is a need for a packaging material having a food grade coating which is water and fat resistant, having good mechanical properties and is relatively simple to produce.

SUMMARY OF THE INVENTION

In accordance with the present invention, a packaging material is provided which comprises a substrate and a food grade coating which is resistant to water, humidity or fat, wherein the coating comprises by weight about 60 to 70% of heat-coagulated egg white, about 25 to 30% of plasticizer, about 5 to 10% of emulsifier and about 3 to 8% is of water.

The invention further provides a process for producing a coated packaging material comprising applying a coating solution on a packaging material substrate, wherein the coating solution applied comprises a mixture of component ingredients, wherein the ingredients comprise from about 25 to 30% egg white powder, about 10 to 15% plasticizer, about 2 to 5% emulsifier and about 50 to 63% water, and then coagulating and drying the coating.

DETAILED DESCRIPTION OF THE INVENTION

In accordance with the present invention, the packaging material substrate may be made of any suitable material, for example paper, cardboard, paperboard, metal, synthetic foam, plastic, linen, or a combination thereof. Therefore, the substrate has great versatility. For instance, the substrate may be used for plates, backing pans, packing systems for frozen food, like fish, vegetables, fruit, ice-creams, meat or pizza, or for other similar applications. It also may be used to pack sausages, hamburgers, French fries and other fast food items or as wrapping to prevent meat, fruit or vegetables from drying and keep them fresh, as an alternative to wax paper or other similar applications.

There are many advantages of the barrier coating. Primarily, the use of egg white as a source of protein avoids the need of soy protein and all the disadvantages of soy protein. Since only egg white is used as protein source for the film, it is easier to manufacture. Furthermore, the egg white in the coating coagulates almost instantly during a thermal treatment and this saves time and money in fixing the coating on the substrate. Also the egg white protein does not need any particular type of substrate to permit its adhesion, since there is no active reaction between the coating and the substrate as needed in the prior art.

In the packaging material according to the invention, the plasticizer is selected from polyethylene glycol, polypropylene glycol and glycerol, and mixtures thereof. The emulsifier is an acetylated monoglyceride.

The coating further comprises up to 3% by weight of lecithin.

In the present invention, the egg white provides the insoluble structure for the coating. It is to be considered that increasing the amount of protein in the solution increases the viscosity of the coating solution and makes it more difficult to form a thin layer on a chosen substrate, and it has been observed that using about 25 to 30% of egg white powder is best for the coating composition. If a thin coating is desired on the substrate, it is either possible to decrease the amount of egg white powder in the solution or it is possible to use rollers to spread the coating on the substrate.

Water is preferably used to dissolve the egg white powder in order to form the basic solution for the film. To obtain an optimal solution, about 50 to 63% of water is needed to get the good spreadability and short drying duration desired for the coating. Increasing the amount of water extends the drying period.

To improve the water, humidity and fat barrier properties, an emulsifier, for instance acetylated monoglyceride, is added to the coating solution. The emulsifier shows also a direct effect on the viscosity of the solution and on the homogeneity of the coating structure. It has been observed that increasing the amount of the emulsifier also increases a tendency for irregular coating and cracking. For best results, about 2 to 5% of emulsifier is used.

To ensure good mechanical properties, a plasticizer, for instance polyethylene glycol, polypropylene glycol or glycerol, is added to the emulsifier in order to increase the elasticity of the coated substrate. Since the plasticizer reduces the water, humidity and fat barrier properties, about 12 to 15% of glycerol have been found to be best for this type of coating although this amount can be extended to about 10 to 15% with acceptable results.

After the plasticizer and the emulsifier have been mixed together, this solution is added to the previous egg white solution to obtain a homogeneous final solution that can be applied on the surface of the substrate. The final solution is characterized by a low viscosity well suited to be applied on a desired substrate in a way to form a uniform thickness.

To obtain better homogeneity of the coating, lecithin may be employed as an ingredient for the coating composition, and it may be added to the egg white and water solution before adding the plasticizer and the emulsifier solution. Adding lecithin in small amounts, up to about 1%, avoids the formation of foam generated by egg white within the solution.

The final solution can be applied on the surface of the substrate with a brush, by roller, by spraying or any other equivalent system. The amount of applied solution is about 80 to 120 g/m$^2$ in order to get a final coating after heating and drying on the order of 0.05 to 0.15 mm, which is needed for good humidity, water and grease barrier properties.

After the substrate has been coated, the coating is fixed by a thermal treatment. The thermal treatment consists of about 1 to 10 min. at a temperature of about 60 to 100° C. in order to ensure the coagulation of the egg white contained within the coating. This operation can be done either in a heating tunnel for a continuous production or in an oven for a batch production. The thermal energy can be generated for instance by an I.R. radiator, by hot air, by vapor or by any equivalent equipment.

After the drying of the coating on the substrate, the proportions of the coating components change according to the amount of liquid which has been evaporated. The remaining moisture after heating should be on the order of 6%, which is best to ensure elasticity of the barrier material. While the amount of water decreases all other component proportions increase, in that the egg white proportion increases to about 60 to 70% by weight, the plasticizer quantity is about 25 to 30%, the emulsifier amount is on the order of 5 to 10% and there should be less than about 3% of lecithin within the dried coating.

The properties of a substrate coated with the food grade coating described earlier in this document generate interesting possibilities:

As it would be the case for any other food grade waterproof, humidity-proof and fat-proof packaging material there is no need to use additional plastic bags or aluminum trays to separate the food and the substrate since the food is not directly in contact with the substrate but with its food grade coating, i.e., the coating thereby being positioned between the food and the material of the coated packaging material. Consequently, no water, humidity or fat is able to migrate through the coating to the substrate and so no non-edible component from the substrate to the food. Nevertheless compared to the known food grade coatings, this one is far more stable when exposed to heat or coldness or mechanical stress and it is transparent as well. This packaging material is elastic at room temperature and does not crack upon freezing at 50° C. It withstands a temperature of 100° C. without visible alterations and since there is no aluminum tray to contain the food, the packing system allows heating in a microwave oven so that the food can stay in its package until the cooking is done.

EXAMPLES

To illustrate the description of the invention above, a couple of concrete examples which have been carried out are given.

Example 1

The proposed barrier is to coat and to protect a cardboard substrate used as a frozen food carton for frozen pizzas which are supposed to be cooked directly in their package.

The protective coating of the substrate is made out of the following amounts of components:
27.5% of egg white powder,
15% of glycerol,
2% of acetylated monoglyceride and
55.5% of water.

First of all the egg white powder is to be dissolved in the water. Then glycerol and acetylated monoglyceride which have been mixed together is added to the dissolved egg white powder to obtain a homogeneous solution.

Then 100 g/m$^2$ of solution are applied on a carton with a brush to form a thin and regular thick film to obtain a final thickness after heating of 0.1 mm which is enough to guaranty the water, humidity and fat barrier properties.

After the solution has been spread on the substrate, it is fixed by a thermal treatment. The thermal treatment is carried out in an oven using an I.R radiator as a thermal energy source.

Example 2

This example illustrates a coating of a fast-food paperboard tray for hamburgers to be sold as take-away food.

The coating is made from a liquid solution containing the following proportions of components:
27.5% of egg white powder,
12% of glycerol,
5% of acetylated monoglyceride,
55% of water and
0.5% of lecithin.

The mixing of the components is done as in the previous example except that the lecithin is added to the egg white and water solution before the glycerol and acetylated monoglyceride solution is added to the dissolved egg white powder.

After the mixing of the solution, a film of 120 g/m$^2$ of solution is spread on the substrate with a brush in order to get a final thickness of 0.15 mm. After coating the substrate, the heating and drying operation is done in a heating tunnel using vapor as thermal energy source.

Example 3

This example illustrates to a coating of paper for wrapping fresh food like vegetables, fruit, meat, fish, cheese, etc. This paper is an alternative to the traditional wax paper used for the same purpose.

The composition of the solution which is to be spread and later dried on the paper is the following:
27.5% of egg white powder,
10% of glycerol,
2% of acetylated monoglyceride,
60% of water and
0.5% of lecithin.

The preparation of the solution, the coating of the substrate and the drying is done as described in the procedure of the example 2.

We claim:

1. A process for preparing a material for packaging foodstuffs comprising:

mixing ingredients comprising egg white powder, a plasticizer, an emulsifier and water to obtain a mixture wherein, by weight based upon mixture weight, the egg white powder mixed is in an amount of from about 25% to 30%, the plasticizer mixed is in an amount of from about 10% to 15%, the emulsifier mixed is in an amount of from about 2% to 5% and the water mixed is in an amount of from about 50% to 63%;

applying the mixture onto a packaging material surface to obtain a mixture-coated packaging material; and heating the mixture-coated packaging material coating to coagulate and dry the coating to obtain a coated packaging material.

2. A process according to claim 1 further comprising first mixing the egg white powder and water to obtain a first mix and separately mixing the plasticizer and emulsifier to obtain a second mix and then mixing the first mix and second mix for mixing the egg white powder, plasticizer, emulsifier and water to obtain the mixture.

3. A process according to claim 1 or 2 wherein the plasticizer is selected from the group consisting of polyethylene glycol, polypropylene glycol and glycerol.

4. A process according to claim 1 or 2 wherein the emulsifier is an acetylated monoglyceride.

5. A process according to claim 3 wherein the emulsifier is an acetylated monoglyceride.

6. A process according to claim 1 wherein the ingredients further comprise lecithin mixed in an amount of up to 1% by weight.

7. A process according, to claim 2 wherein the ingredients further comprise lecithin mixed in an amount of up to 1% by weight and wherein the lecithin is mixed with the egg white powder and water ingredients to obtain the first mix.

8. A process according to claim 7 wherein the plasticizer is selected from the group consisting of polyethylene glycol polypropylene glycol and glycerol and wherein the emulsifier is an acetylated monoglyceride.

9. A process according to claim 1 or 2 wherein the mixture is applied to the packaging material surface in an amount of from about 80 g/m$^2$ to 120 g/m$^2$.

10. A process according to claim 1 wherein the coating is heated at a temperature of from about 60° C. to 100° C. for a time on an order of from 1 minute to 10 minutes.

11. A process according to claim 1 wherein the packaging material comprises a material selected from the group consisting of paper, paperboard, cardboard, a synthetic foam, a plastic, linen and metal.

12. A process according to claim 1 wherein the packaging material comprises a material selected from the group consisting of paper, paperboard and cardboard.

13. A process according to claim 1 wherein the mixture is applied onto the packaging material surface by an application method selected from the group consisting of spraying the mixture onto the surface, brushing the mixture onto the surface and rolling the mixture onto the surface.

14. A process according to claim 1 wherein the coated packaging material is heated in an oven.

15. A process according to claim 14 wherein the oven is a tunnel oven.

16. The product of process of claim 1.

17. A material for packaging foodstuffs comprising a packaging material and a material coated on the packaging material wherein, by weight based upon coating weight, the coating comprises from about 60% to 70% heat-coagulated egg white, from about 25% to 30% plasticizer, from about 5% to 10% emulsifier and from about 3% to 8% water.

18. A coated packaging material according to claim 17 wherein the plasticizer is selected from the group consisting of polyethylene glycol, polypropylene glycol and glycerol.

19. A coated packaging material according to claim 17 or 18 wherein the emulsifier is an acetylated monoglyceride.

20. A coated packaging material according to claim 17 or 18 wherein the coating further comprises lecithin and the lecithin is present and in an amount of up to 3% by weight.

21. A coated packaging material according to claim 19 wherein the coating further comprises lecithin and the lecithin is present and in an amount of up to 3% by weight.

22. A coated packaging material according to claim 17 wherein the coating has a thickness of from 0.05 mm to 0.15 mm.

\* \* \* \* \*